United States Patent
Voss et al.

(10) Patent No.: US 11,485,053 B2
(45) Date of Patent: Nov. 1, 2022

(54) SMART SUSCEPTOR INDUCTION HEATING APPARATUS AND METHODS HAVING IMPROVED TEMPERATURE CONTROL

(71) Applicant: The Boeing Company, Chicago, IL (US)

(72) Inventors: Bret A. Voss, Seattle, WA (US); Marc R. Matsen, Seattle, WA (US); Jeffrey H. Olberg, Federal Way, WA (US); James R. Jones, Tacoma, WA (US)

(73) Assignee: The Boeing Company, Chicago, IL (US)

( * ) Notice: Subject to any disclaimer, the term of this patent is extended or adjusted under 35 U.S.C. 154(b) by 315 days.

(21) Appl. No.: 16/201,612

(22) Filed: Nov. 27, 2018

(65) Prior Publication Data

US 2020/0164548 A1    May 28, 2020

(51) Int. Cl.
*B29C 35/08* (2006.01)
*H05B 6/06* (2006.01)
(Continued)

(52) U.S. Cl.
CPC .......... *B29C 35/0805* (2013.01); *H05B 6/06* (2013.01); *H05B 6/105* (2013.01); *H05B 6/44* (2013.01);
(Continued)

(58) Field of Classification Search
CPC ........ B29C 35/0805; B29C 2035/0811; H05B 6/06; H05B 6/105; H05B 6/44;
(Continued)

(56) References Cited

U.S. PATENT DOCUMENTS 3,495,857 A * 2/1970 Hawke ................. F16B 5/0225
403/57
4,463,547 A    8/1984 Young
(Continued)

FOREIGN PATENT DOCUMENTS

EP             3210736 A1    8/2017
WO    WO-2006136743 A1 * 12/2006 ......... B29C 35/0805

OTHER PUBLICATIONS

Machine English Translation of WO-2006136743-A1 (Year: 2006).*
Extended Search Report for related European Patent Application No. 19192241.8; report dated Feb. 26, 2020.

*Primary Examiner* — Tu B Hoang
*Assistant Examiner* — Erwin J Wunderlich
(74) *Attorney, Agent, or Firm* — Quinn IP Law

(57) ABSTRACT

Heating apparatus and methods for thermally processing a part including improved control of temperature. A thermal management system is coupled to a back surface of a table thermally coupled to an inductive heating circuit. The thermal management system includes a chamber defining an interior space, at least one cooling fin disposed within the chamber, an inlet extending through the chamber and fluidly communicating with the interior space, and an outlet extending through the chamber and fluidly communicating with the interior space. In some applications, an air source fluidly communicates with the inlet and is selectively operable to generate an air flow through the chamber, so that the thermal management system may be selectively operated in an insulator mode and a cooling mode.

20 Claims, 15 Drawing Sheets

(51) Int. Cl.
  *H05B 6/10*     (2006.01)
  *H05B 6/44*     (2006.01)
  *B29K 101/12*   (2006.01)

(52) U.S. Cl.
  CPC ... *B29C 2035/0811* (2013.01); *B29K 2101/12* (2013.01); *H05B 2206/023* (2013.01)

(58) Field of Classification Search
  CPC .............. H05B 2206/023; H05B 6/108; B29K 2101/12; B32B 15/015; B32B 15/013; B32B 15/01
  USPC ........................................................ 219/634
  See application file for complete search history.

(56) References Cited

U.S. PATENT DOCUMENTS

| | | | |
|---|---|---|---|
| 4,470,248 A | 9/1984 | Nortenius | |
| 5,330,608 A | 7/1994 | Kemmler et al. | |
| 5,483,043 A * | 1/1996 | Sturman, Jr. | ........... B29C 35/08 219/634 |
| 5,517,812 A | 5/1996 | Simmons | |
| 7,007,501 B2 * | 3/2006 | Hu | .......................... F25B 25/00 62/435 |
| 7,034,251 B1 | 4/2006 | Child et al. | |
| 7,520,120 B2 | 4/2009 | Saito et al. | |
| 7,698,883 B2 | 4/2010 | Dye | |
| 8,236,223 B2 | 8/2012 | Graves et al. | |
| 8,330,086 B2 | 12/2012 | Miller et al. | |
| 8,884,201 B2 | 11/2014 | Matsen et al. | |
| 9,259,886 B2 * | 2/2016 | Matsen | ................... B29C 73/30 |
| 9,544,945 B2 * | 1/2017 | Hadoulias | ................ H05B 6/06 |
| 9,719,194 B2 | 8/2017 | Chi-Hsueh | |
| 9,914,269 B2 | 3/2018 | Hopkins et al. | |
| 9,986,602 B2 | 5/2018 | Chen et al. | |
| 2005/0028512 A1 | 2/2005 | Boni | |
| 2005/0035115 A1 | 2/2005 | Anderson et al. | |
| 2008/0083209 A1 | 4/2008 | Saito et al. | |
| 2008/0144279 A1 * | 6/2008 | Yamamoto | ......... H05K 7/20918 361/694 |
| 2008/0303194 A1 * | 12/2008 | Anbarasu | ............ B29C 35/0805 264/403 |
| 2010/0065552 A1 | 3/2010 | Matsen et al. | |
| 2011/0139769 A1 | 6/2011 | Miller et al. | |
| 2012/0145702 A1 | 6/2012 | Miller et al. | |
| 2012/0145703 A1 | 6/2012 | Matsen et al. | |
| 2013/0082047 A1 | 4/2013 | Matsen et al. | |
| 2015/0218734 A1 | 8/2015 | Chi-Hsueh | |
| 2016/0157302 A1 | 6/2016 | Matsen et al. | |
| 2017/0008266 A1 * | 1/2017 | Humfeld | ................ B29C 70/44 |
| 2017/0092421 A1 | 3/2017 | Hottes et al. | |
| 2017/0094729 A1 | 3/2017 | Hottes et al. | |
| 2017/0095986 A1 * | 4/2017 | Feigenblum | ........ B29C 35/0805 |
| 2017/0135156 A1 | 5/2017 | Miller et al. | |
| 2017/0135157 A1 | 5/2017 | Miller et al. | |
| 2017/0144332 A1 * | 5/2017 | Humfeld | .............. B29C 35/0227 |
| 2017/0246815 A1 | 8/2017 | Kestner et al. | |
| 2017/0246816 A1 | 8/2017 | Hopkins et al. | |
| 2018/0147794 A1 | 5/2018 | Hopkins et al. | |
| 2019/0239293 A1 | 8/2019 | Henson et al. | |

* cited by examiner

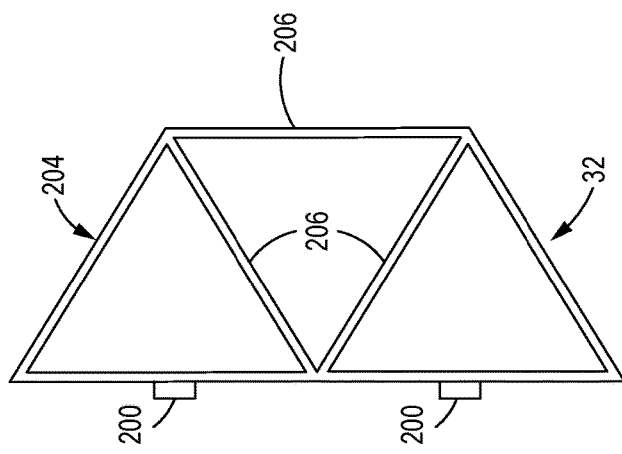
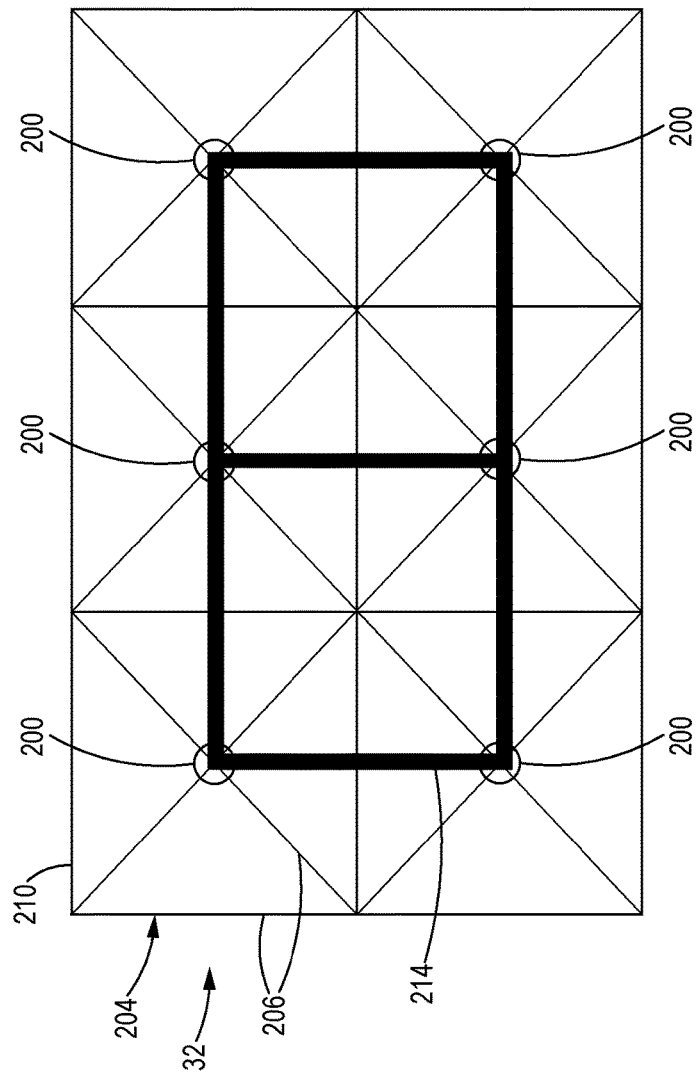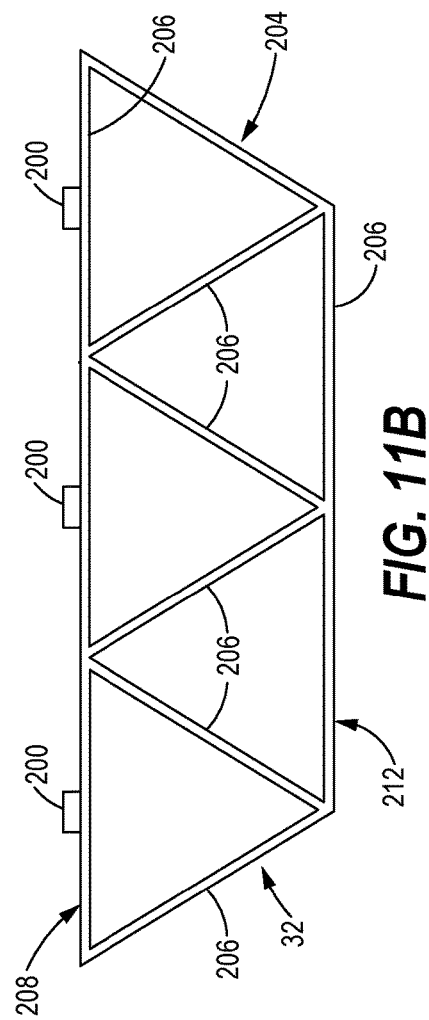
FIG. 11A
FIG. 11B
FIG. 11C

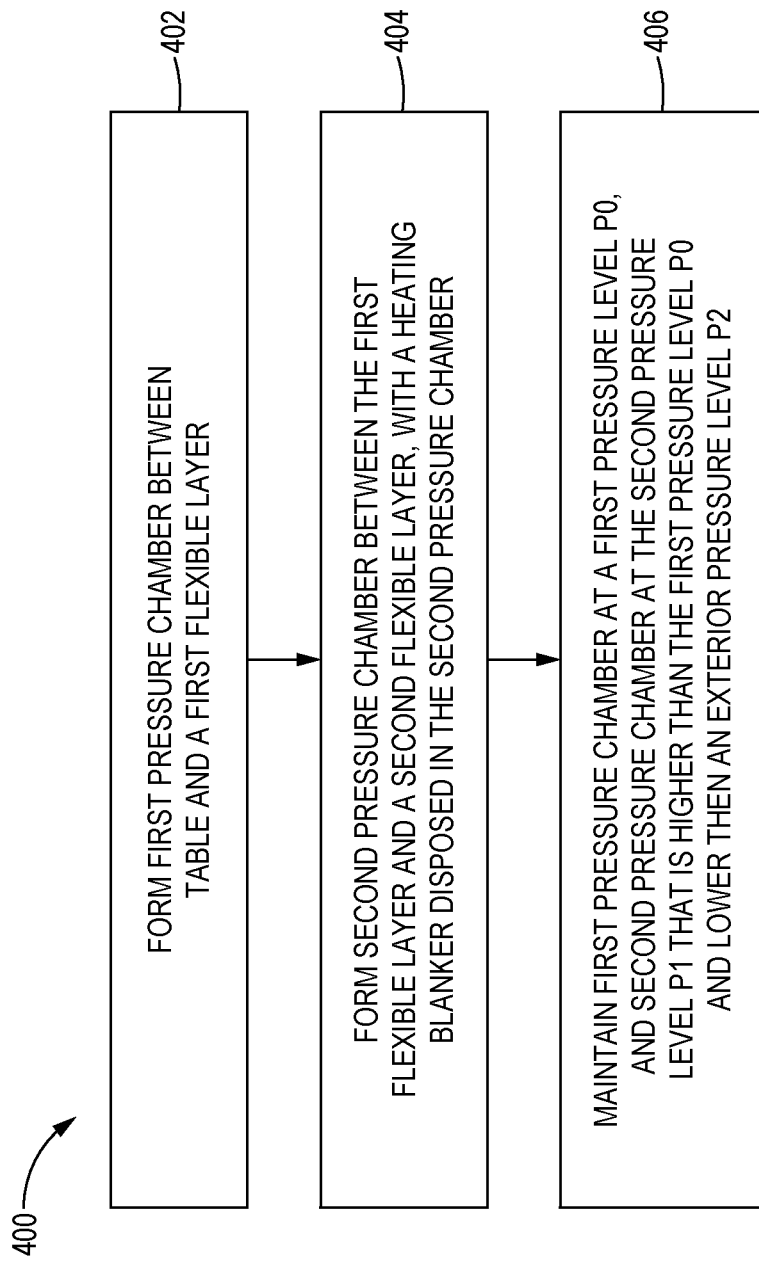

SMART SUSCEPTOR INDUCTION HEATING APPARATUS AND METHODS HAVING IMPROVED TEMPERATURE CONTROL

FIELD

The present disclosure generally relates to apparatus and methods of heating a part to a processing temperature and, more particularly, to such apparatus and methods using smart susceptor induction heating to obtain substantially uniform temperature across the part.

BACKGROUND

The use of inductively heated smart susceptors have been used in heating blankets or stand-alone heating tools to cure or otherwise process parts requiring application of heat. While such devices are known to sufficiently obtain a uniform temperature across a given area, current designs have a limited total areas across which uniform heating can be provided, are limited to processing certain part shapes, and have overly long heating/cooling cycles when processing multiple parts.

SUMMARY

In accordance with one aspect of the present disclosure, a heating apparatus is provided for thermally processing a part. The heating apparatus includes a table formed of a thermally conductive material and defining a table surface oriented to face a first surface of the part and a back surface opposite the table surface. A table inductive heating circuit is thermally coupled to the table and configured to generate a processing temperature at the table surface, the table inductive heating circuit comprising a plurality of table induction coil circuits electrically coupled in parallel with each other, wherein each of the plurality of table induction coil circuits includes a table electrical conductor and a table smart susceptor having a Curie temperature. A thermal management system is coupled to the back surface of the table and includes a chamber defining an interior space, at least one cooling fin disposed within the chamber, an inlet extending through the chamber and fluidly communicating with the interior space, and an outlet extending through the chamber and fluidly communicating with the interior space.

In accordance with another aspect of the present disclosure, a method of thermally processing at least one part using a heating apparatus includes placing a first part on a table surface of a table of the heating apparatus, heating the table surface to a processing temperature using a table inductive heating circuit provided with the heating apparatus, the table inductive heating circuit comprising a plurality of table induction coil circuits electrically coupled in parallel with each other, wherein each of the plurality of table induction coil circuits includes a table electrical conductor and a table smart susceptor having a Curie temperature, operating a thermal management system provided with the heating apparatus in an insulator mode to maintain the table surface at the processing temperature until the first part is thermally processed, and operating the thermal management system in a cooling mode to cool the table surface to a reduced temperature.

In accordance with a further aspect of the present disclosure, a heating apparatus for thermally processing a part includes a table formed of a thermally conductive material and defining a table surface oriented to face a first surface of the part and a back surface opposite the table surface, the back surface of the table defining a groove extending partially through the table toward the table surface. A table inductive heating circuit is disposed in the groove formed in the back surface of the table and configured to generate a processing temperature at the table surface. The table inductive heating circuit includes a plurality of table induction coil circuits electrically coupled in parallel with each other, wherein each of the plurality of table induction coil circuits includes a table electrical conductor and a table smart susceptor having a Curie temperature. A thermal management system is coupled to the back surface of the table, the thermal management system including a chamber defining an interior space, at least one cooling fin disposed within the chamber, an inlet extending through the chamber and fluidly communicating with the interior space, and an outlet extending through the chamber and fluidly communicating with the interior space. The heating apparatus further includes three hubs coupled to the back surface of the table and spaced from each other, each of the three hubs including a stem, and a support assembly coupled to the hubs. The support assembly includes a frame comprising a plurality of interconnected trusses, the frame having an upper end defining an upper end boundary extending around an upper end cross-sectional area, and a lower end defining a lower end boundary extending around a lower end cross-sectional area, wherein the lower end cross-sectional area is smaller than the upper end cross-sectional area, and three adapters coupled to the upper end of the frame, each of the three adapters being positioned for alignment with an associated hub and defining a socket sized to receive the stem of the associated hub.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

FIGS. 11A-C are plan, side elevation, and end views, respectively, of a support assembly for use in the heating apparatus of FIG. 1.

FIG. 14 is a block diagram of a method of positioning a heating blanket by controlling pressures in first and second pressure chambers in the upper heating assembly of FIG. 13.

It should be understood that the drawings are not necessarily drawn to scale and that the disclosed embodiments are sometimes illustrated schematically. It is to be further appreciated that the following detailed description is merely exemplary in nature and is not intended to limit the invention or the application and uses thereof. Hence, although the present disclosure is, for convenience of explanation, depicted and described as certain illustrative embodiments, it will be appreciated that it can be implemented in various other types of embodiments and in various other systems and environments.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
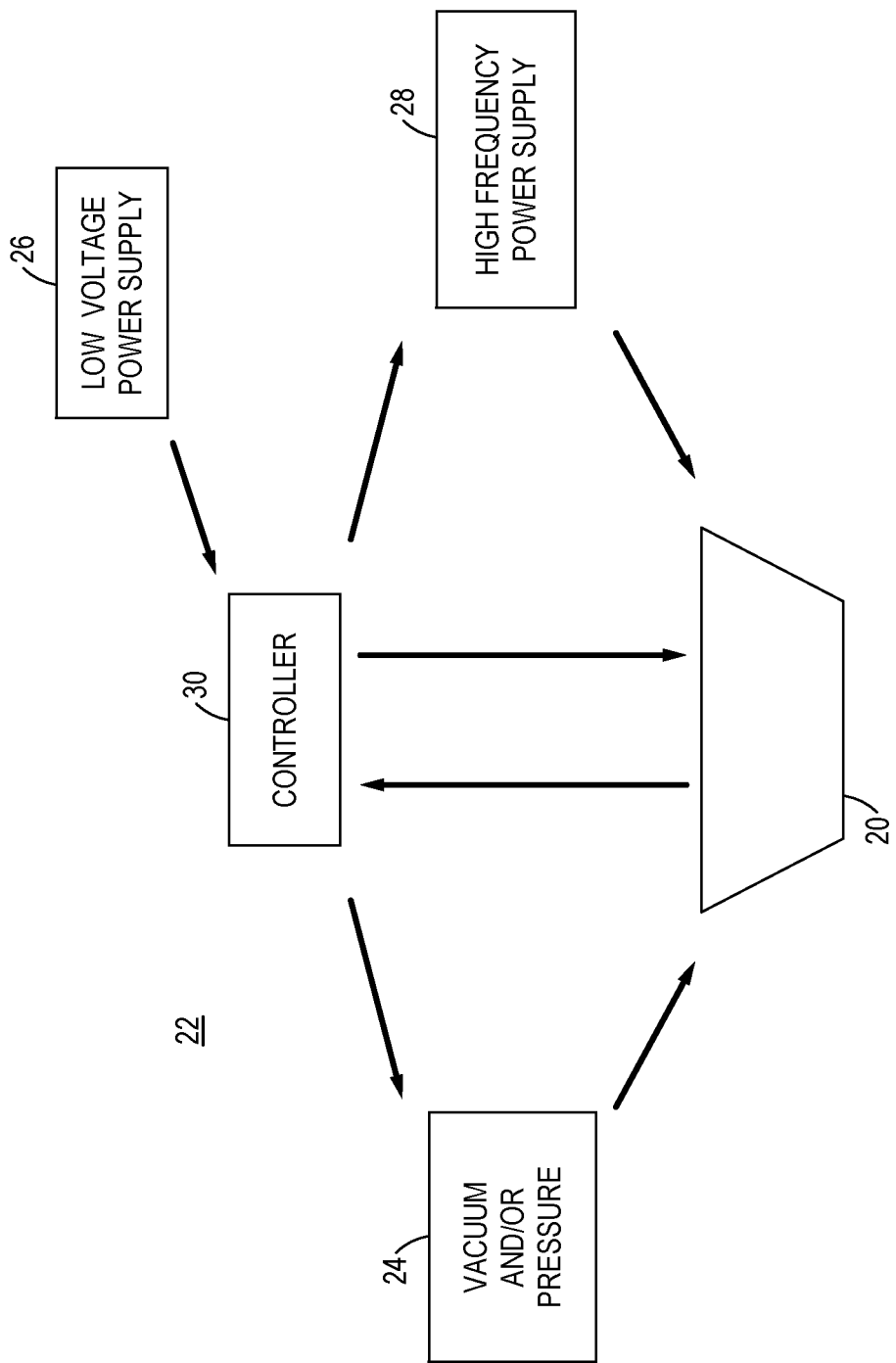
FIG. 1 is a schematic diagram of a heating apparatus according to the present disclosure provided at a processing location.

FIG. 1 schematically illustrates an example of a heating apparatus 20, according to the present disclosure, for curing, forming, or otherwise processing a part 21. The heating apparatus 20 is shown as a stand-alone tool provided at a processing location 22. The processing location 22 includes multiple interfaces which enable operation of the heating apparatus 20, such as a pressurized fluid source 24 (which is capable of providing a fluid, such as air or nitrogen, at positive and/or negative pressures), a low voltage power supply 26, and a high frequency power supply 28. A controller 30, provided either with the heating apparatus 20 or at the processing location 22, is operably coupled to the pressurized fluid source 24, low voltage power supply 26, and high frequency power supply 28 control operation of the heating apparatus 20 and receive feedback signals from the heating apparatus 20. In the examples described below, the heating apparatus 20 is portable, so that multiple heating apparatus 20 may be used, either sequentially or simultaneously, at the same processing location 22.

Figure 2:
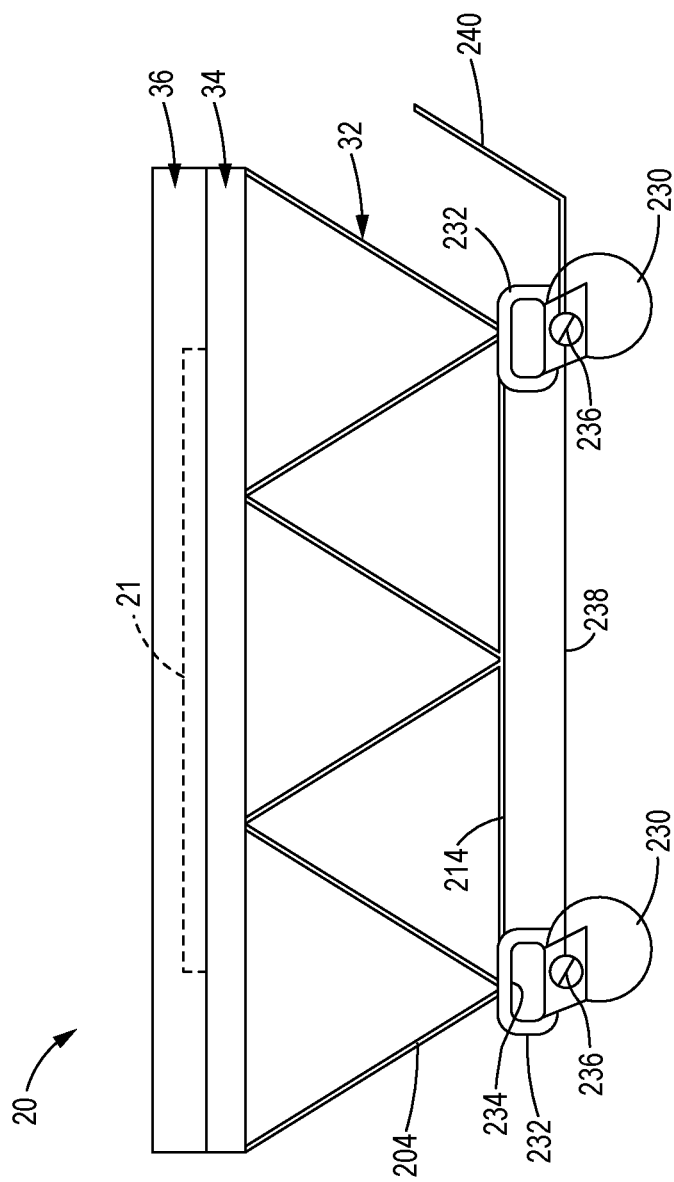
FIG. 2 is a side elevation view of the heating apparatus of FIG. 1.

The heating apparatus 20 is shown in greater detail at FIG. 2. Generally, the heating apparatus 20 includes a support assembly 32 supporting a lower heating assembly 34 and an upper heating assembly 36. The upper heating assembly 36 is movable relative to the lower heating assembly 34 to permit insertion and removal of the part 21 to be heated. The type of moveable connection between the lower heating assembly 34 and the upper heating assembly 36 is based, in part, by the size of the heating apparatus 20 and the size and shape of the part 21 to be processed. For example, when the part 21 has a flat or near-flat shape, the upper heating assembly 36 may be pivotally coupled to the lower heating assembly 34, such as by a hinged connection. As understood in greater detail below, each of the lower heating assembly 34 and the upper heating assembly 36 includes an inductive heating circuit, thereby to supply heat to all outer surfaces of the part 21.

The heating apparatus 20 heats the part 21 to a processing temperature. That is, the inductive heating circuits in either or both of the lower and upper assemblies 34, 36 are operated to heat the part 21 to a desired temperature. In some examples, the part 21 is formed of a composite material and the processing temperature is a curing temperature of the composite material. In other examples, the part 21 is formed of a thermoplastic material and the processing temperature is a consolidation temperature of the material. Curing temperature and consolidation temperature are only two exemplary processing temperatures, however, as the heating apparatus 20 may be used in other types of processes with parts formed of other materials having different characteristics.

Figure 3:
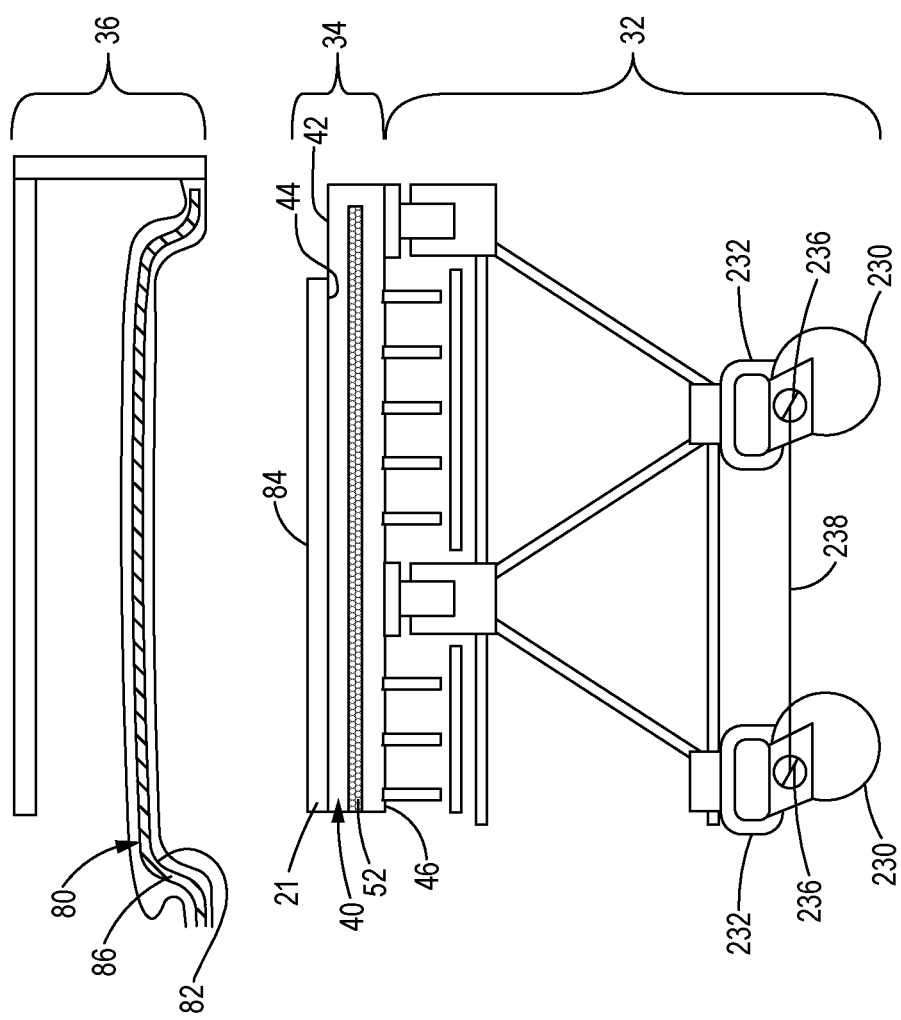
FIG. 3 is a partial end elevation view, in cross-section, of the heating apparatus of FIG. 1.
Figure 4:
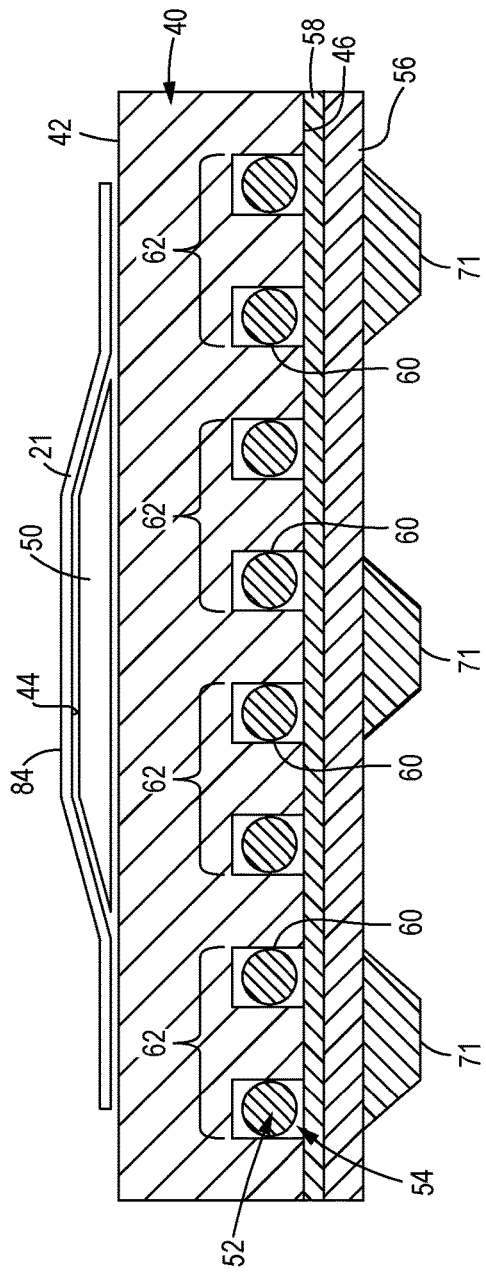
FIG. 4 is an end elevation view, in cross-section, of a table for use in the heating apparatus of FIG. 1.

Referring to FIG. 3, the lower heating assembly 34 of the heating apparatus includes a table 40 formed of a thermally conductive material that defines a table surface 42. Exemplary thermally conductive materials include steel, alloy steel (including nickel-iron alloy), and aluminum, however other materials that conduct heat may also be used. The table 40 is sized to accommodate the part 21. In some examples, the table 40 is four feet wide and eight feet long, however the table 40 may have a width and a length that is smaller or larger. Additionally, in some examples the table 40 has a thickness in a range of approximately ¼" to 1", however smaller or larger table thicknesses outside this exemplary range may be used. Heat generated at a back surface 46 of the table 40 is conducted through the thickness of the table 40 to the table surface 42. As shown in FIG. 3, a first surface 44 of the part 21 is placed directly onto the table surface 42, thereby to form the part 21 with a substantially flat shape. Alternatively, as shown in FIG. 4 and discussed in greater detail with reference to FIGS. 9A-9C, a tool 50 formed of a thermally conductive material is placed on the table surface 42 and the part 21 is placed on top of the tool 50.

A table inductive heating circuit 52 is thermally coupled to the table 40 and operable to heat at least the table surface 42 to a processing temperature. In the example illustrated in FIG. 4, the table inductive heating circuit 52 is disposed within a groove 54 that is formed in the back surface 46 of the table 40, and which extends partially through the table 40 toward the table surface 42. By locating the table inductive heating circuit 52 in the groove 54 provided on the back surface 46, the table inductive heating circuit 52 avoids direct contact with the part 21 and/or tool 50, thereby protecting the table inductive heating circuit 52 from wear. To further protect the table inductive heating circuit 52, in some examples a cover 56 is coupled to the back surface 46 of the table 40 and sized to close off the groove 54, thereby fully enclosing the table inductive heating circuit 52. The cover 56 is joined to the back surface 46 of the table by adhesive 58, welding, or other coupling means. Ribs 71 may be coupled to the cover 56 to structurally support the table 40 and promote air flow across the cover 56. The ribs 71 may be formed integrally with the cover 56 to facilitate easier assembly of the heating apparatus 20. In the example shown in FIG. 4, the ribs 71 are illustrated as having trapezoidal cross-sectional shapes, however it will be appreciated that the ribs 71 may be formed with other cross-sectional shapes, such as square or rectangular blades, In the example shown in FIG. 4, the groove 54 includes a plurality of groove sections 60 spaced throughout the table 40. The table inductive heating circuit 52 includes a plurality of table induction coil circuits 62, with each table induction coil circuit 62 disposed in as associated groove section 60. The groove sections 60 and table induction coil circuits 62 are distributed over the area of the table 40 to provide more uniform heating of the entire table surface 42.

Figure 5:
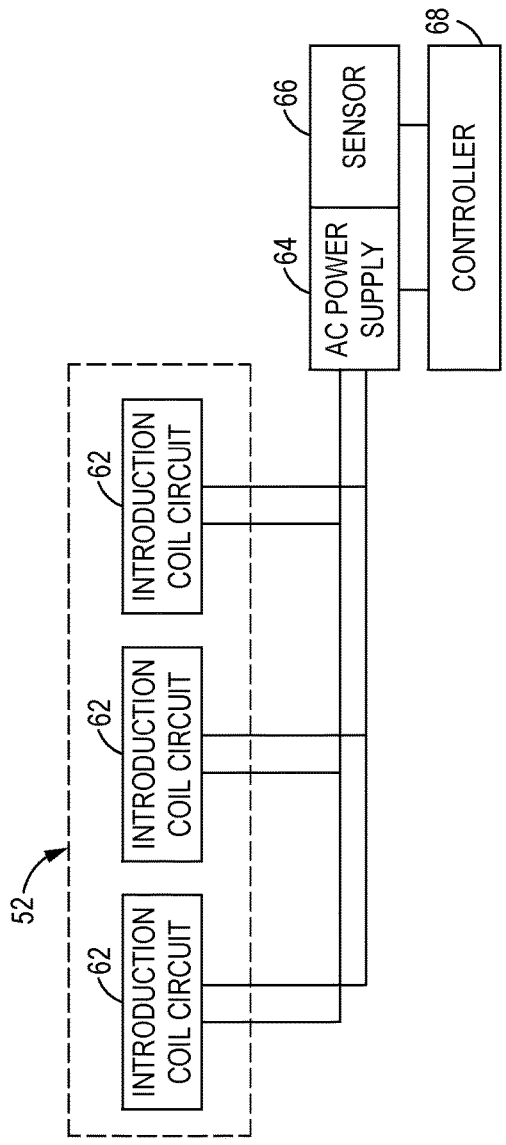
FIG. 5 is a schematic block diagram of an inductive heating circuit for use in the heating apparatus of FIG. 1.

To further promote uniform heating across the table 40, the table induction coil circuits 62 are coupled in parallel to each other, as shown in FIG. 5. The table induction coil circuits 62 further are coupled in series with an AC power supply 64 that supplies alternating current to each of the table induction coil circuits 62. While three table induction coil circuits 62 are shown in FIG. 5, other examples may have greater or less than three circuits to inductively heat the table 40 depending on the size of the table and the intended type of processing to be performed on the part 21. The AC power supply 64 is configured as a portable or a fixed power supply, and supplies alternating current at a frequency and voltage suitable for the application. For example and without limitation, the frequency of the AC current may range from approximately 1 kHz to 300 kHz.

The heating apparatus 20 may incorporate one or more sensors 66, which may be thermal sensors such as thermocouples for monitoring the temperature at various locations across the table 40. Alternatively, the sensor 66 may be provided as a thermal sensor coupled to the power supply 64 to indicate a voltage applied to the table induction coil circuits 62. A controller 68, which may be provided as a programmed computer or programmable logic controller (PLC), is operatively coupled with the power supply 64 and the sensor 66, and is operative to adjust the applied alternating current over a predetermined range in order to adapt the heating apparatus 20 for use in a wide range of parts and structures having different heating requirements. While the controller 68 may be provided feedback from the sensor 66, it is understood that the table induction coil circuits 62 employ a smart susceptor that automatically limits the maximum temperature that is generated without adjustment of voltage, as understood more fully below.

Figure 6:
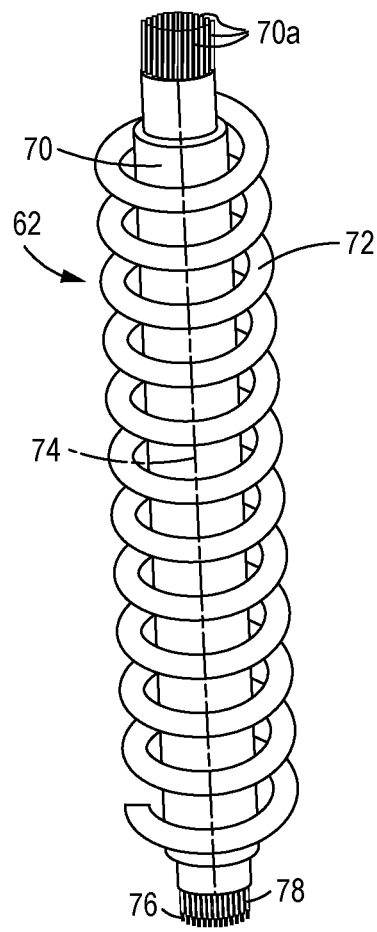
FIG. 6 is a perspective view of an example of an inductive heating circuit having a susceptor wrapped around an electrical conductor for use in the heating apparatus of FIG. 1.

In the illustrated example, each table induction coil circuit 62 includes multiple components that interact to inductively generate heat in response to an applied electrical current. As best shown in FIG. 6, each table induction coil circuit 62 includes an electrical conductor 70 and a smart susceptor 72. The electrical conductor 70 is configured to receive an electrical current and generate a magnetic field in response to the electrical current. More specifically, electric current flowing through the electrical conductor 70 generates a circular magnetic field around the electrical conductor 70, with a central axis of the magnetic field coincident with an axis 74 of the electrical conductor 70. Alternatively, if the electrical conductor 70 is coiled into a spiral shape, the resulting magnetic field is co-axial with an axis of the coiled spiral. In the illustrated example, the electrical conductor 70 is formed of a plurality of electrical conductor strands 70a that are bundled in a Litz wire configuration, as best shown in FIG. 6. More specifically, each electrical conductor strand 70a may include a metal core 76 and a coating 78. The electrical conductor 70 is operatively coupled to the power supply 64 noted above.

The smart susceptor 72 is configured to inductively generate heat in response to the magnetic field generated by the electrical conductor 70. Accordingly, the smart susceptor 72 is formed of a metallic material that absorbs electromagnetic energy from the electrical conductor 70 and converts that energy into heat. Thus, the smart susceptor 72 acts as a heat source to deliver heat via a combination of conductive and radiant heat transfer, depending on the distance between the smart susceptor 72 and location to be heated.

The smart susceptor 72 is formed of a material selected to have a Curie point that approximates a desired maximum heating temperature of the heating apparatus 20. The Curie point is the temperature at which a material loses its permanent magnetic properties. When used in an inductive heating arrangement as described herein, where the smart susceptor 72 generates heat only as long as it is responsive to the magnetic field generated by the electrical conductor 70, the amount of heat generated by the smart susceptor 72 will decrease as the Curie point is approached. For example, if the Curie point of the magnetic material for the smart susceptor 72 is 500° F., the smart susceptor 72 may generate two Watts per square inch at 450° F., may decrease heat generation to one Watt per square inch at 475° F., and may further decrease heat generation to 0.5 Watts per square inch at 490° F. As such, each table induction coil circuit 62 will automatically generate more heat to portions of the table surface 42 that are cooler due to larger heat sinks and less heat to portions of the table surface 42 that are warmer due to smaller heat sinks, thereby resulting in more uniform heating of the part 21 at approximately a same equilibrium temperature. Thus, each table induction coil circuit will continue to heat portions of the heating area that have not reached the Curie point, while at the same time, ceasing to provide heat to portions of the heating area that have reached the Curie point. In so doing, the temperature-dependent magnetic properties, such as the Curie point of the magnetic material used in the smart susceptor 72, may prevent overheating or under-heating of areas of the table surface 42.

The electrical conductor 70 and smart susceptor 72 may be assembled in a configuration that facilitates insertion into the groove 54. In the example illustrated in FIG. 6, the smart susceptor 72 may be wrapped around the electrical conductor 70 in a spiral configuration. Winding the smart susceptor 72 around the electrical conductor 70 not only positions the smart susceptor 72 sufficiently proximate the electrical conductor 70 to magnetically couple the wires, but also mechanically secures the electrical conductor 70 in place, which is particularly advantageous when the electrical conductor 70 is formed of a plurality of electrical conductor strands 70a. Alternatively, however, an opposite configuration may be used, in which the electrical conductor 70 is wrapped around the smart susceptor 72. Still further, other assembly configurations of the electrical conductor 70 and the smart susceptor 72 may be used that achieve the necessary electro-magnetic coupling of the wires.

Referring back to FIG. 3, the upper heating assembly may include a heating blanket 80 for heating from above the part 21. The heating blanket 80 is flexible to conform to a second surface 84 of the part 21, and defines a heating surface 82 facing the part 21. For example, the heating blanket 80 may include a core formed of a pliable material, such as silicone or a polymer, with a blanket inductive heating circuit 86 disposed in the core. Alternatively, the blanket inductive heating circuit 86 itself may be woven or knitted into a flexible layer that conforms to the part 21. The blanket inductive heating circuit 86 is configured to generate the processing temperature at the heating surface 82, and may include an electrical conductor and a smart susceptor similar to the table inductive heating circuit 52 described above.

One or both of the table inductive heating circuit 52 and the blanket inductive heating circuit 86 has a circuit layout that advantageously cancels longer-range electromagnetic field generated by the induction coil circuits. In a first example illustrated at FIGS. 7A and 7B, an inductive heating circuit 100 includes a plurality of induction coil circuits 102 coupled in parallel with each other and in series to the power supply 64. The induction coil circuits 102 are arranged in a nested pattern, with some of the circuits at least partially surrounded (i.e., "nested") by others of the circuits. The plurality of induction coil circuits 102 are spaced to span the entire area of the table 40, thereby to more uniformly distribute heat.

Figure 7B:
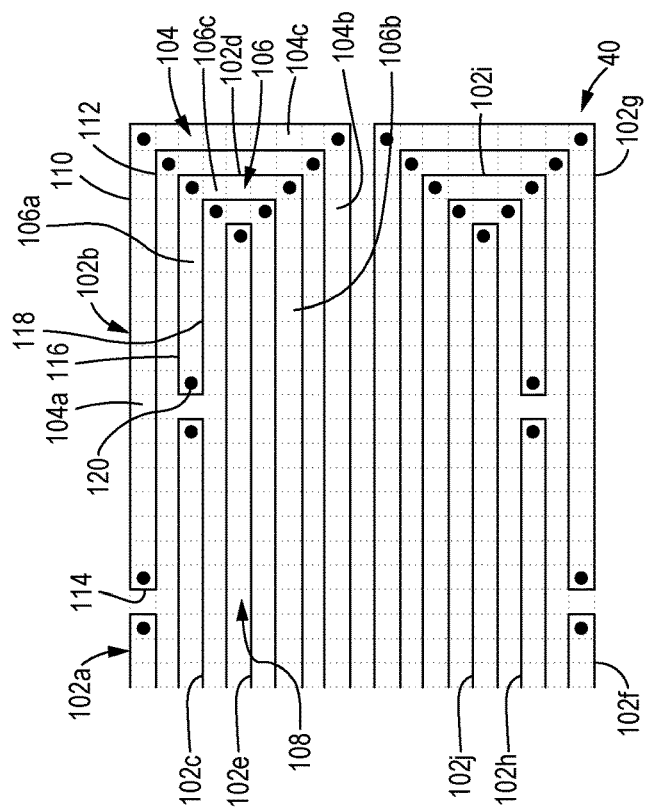
FIGS. 7A and 7B are schematic plan views of an inductive heating circuit layout having a rectilinear hook configuration, for use in the heating apparatus of FIG. 1.
Figure 7A:
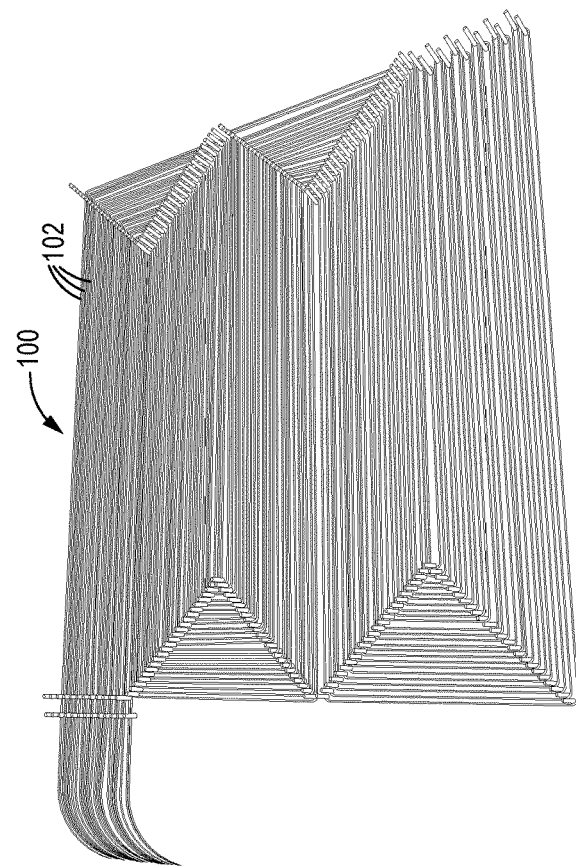

For example, as best shown in FIG. 7B, a first one of the induction coil circuits 102*b* traces a first path 104 across the table 40, with the first path including spaced first and second end sections 104*a*, 104*b* joined by an intermediate section 104*c*. This shape is referred to herein as a rectilinear hook shape. Additionally, a second one of the induction coil circuits 102*d* traces a second path 106 across the table 40, wherein the second path 106 is at least partially nested between the first and second end sections 104*a*, 104*b* of the first path 104. The nested arrangement of the induction coil circuits permits a side-by-side placement of the circuits without overlap, thereby allowing the circuits to be disposed in a common plane. Furthermore, to reduce global electromagnetic field imbalance at the intermediate section 104*c*, the lengths of the induction coil circuits 102*b*, 102*d* are varied. That is, the first of the induction coil circuits 102*b* has a first induction coil length L1, while the second of the induction coil circuits 102*d* has a second induction coil length L2, wherein L2 is different from L1.

Multiple induction coil circuits may be nested. For example, with continued reference to FIG. 7B, the second path 106 traced by the second of the induction coil circuits 102*d* may include spaced first and second end sections 106*a*, 106*b* joined by an intermediate section 106*c*. Additionally, a third of the induction coil circuits 102*e* traces a third path 108 across the table 40. The third path 108 is also at least partially nested between the first and second end sections 104*a*, 104*b* of the first path 104, and may further be at least partially nested between the first and second end sections 106*a*, 106*b* of the second path 106. Still further, the third of the induction coil circuits has a third induction coil length L3 that is different from the first induction coil length L1 and the second induction coil length L2, thereby to further reduce global electromagnetic field imbalances.

Longer-range electromagnetic field may be further reduced by arranging each induction coil circuit in a double-back configuration, in which portions of the circuit lie adjacent to each other. More specifically, as shown in FIG. 7B, the first of the induction coil circuits 102*b* includes a first segment 110 configured to carry current in a first direction along the first path 104, and a second segment 112, positioned adjacent the first segment 110, and configured to carry current in a second direction along first path 104, wherein the first direction along the first path 104 is opposite the second direction along the first path 104. The first segment 110 of the first induction coil circuit 102*b* joins the second segment 112 of the first induction coil circuit 102*b* at a double-back bend 114. The second induction coil circuit 102*d* may be arranged similarly, with a first segment 116 configured to carry current in a first direction along the second path 106, and a second segment 118 positioned adjacent the first segment 116 and configured to carry current in a second direction along second path 106, wherein the first direction along the second path 106 is opposite the second direction along the second path 106. Further, the first segment 116 of the second induction coil circuit 102*d* joins the second segment 118 of the second induction coil circuit 102*d* at a double-back bend 120. Because the first and second segments of each circuit will have the same current flowing in opposite directions, the double-back configuration advantageously at least partially cancels the longer-range electromagnetic field generated by the induction coil circuits.

Figure 8B:
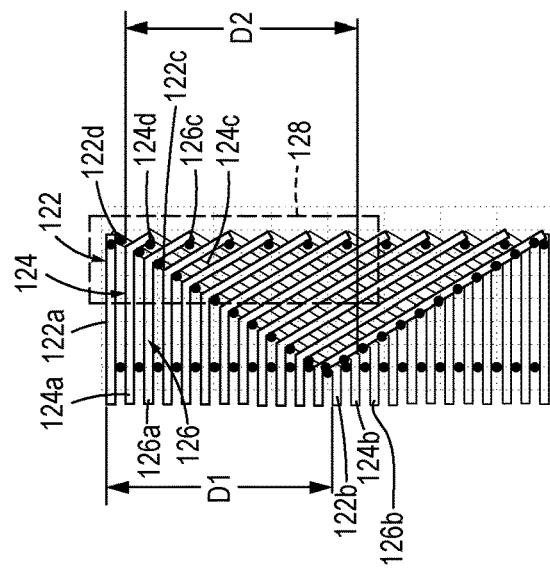
FIGS. 8A and 8B are schematic plan views of an alternative example of an inductive heating circuit layout having rhombus turns, for use in the heating apparatus of FIG. 1.
Figure 8A:
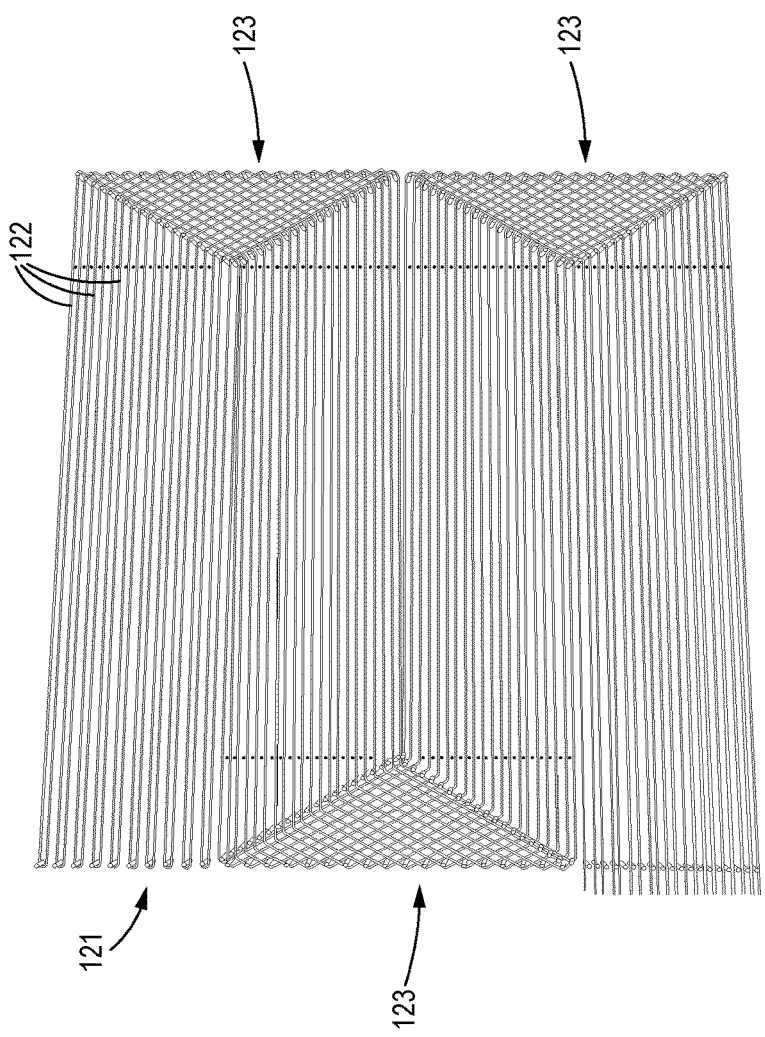

An alternative circuit layout is illustrated at FIGS. 8A and 8B, which show a rhombus turn configuration. In this example, an inductive heating circuit 121 is provided having a plurality of induction coil circuits 122. As shown, the induction coil circuits 122 form three rhombus turns 123, however a different number of rhombus turns may be provided. In this configuration, a first induction coil circuit 122 has spaced first and second end segments 122*a*, 122*b* joined by an intermediate segment 122*c*. Similarly, a second induction coil circuit 124 has spaced first and second end segments 124*a*, 124*b* joined by an intermediate segment 124*c*. In this example, the first and second induction coil circuits 122, 124 have substantially the same lengths, with the intermediate segment 122*c* of the first induction coil circuit 122 overlapping the intermediate segment 124*c* of the second induction coil circuit 124. As best shown in FIG. 8B, the intermediate segments have vertices. That is, the intermediate segment 122*c* of the first induction coil circuit 122 includes first and second sections joined at a vertex 122*d*, and the intermediate segment 124*c* of the second induction coil circuit 124 includes first and second sections joined at a vertex 124*d*. In this example, the second section of the intermediate segment 122*c* overlaps the first section of the intermediate segment 124*c*.

With continued reference to FIG. 8B, the first and second end segments 122*a*, 122*b* of the first induction coil circuit 122 are substantially parallel and spaced by a first lateral distance D1. Similarly, the first and second end segments 124*a*, 124*b* of the second induction coil circuit 124 are substantially parallel and spaced by a second lateral distance D2, wherein the first lateral distance D1 is substantially equal to the second lateral distance D2.

Still further, additional induction coil circuits 122 may be provided. For example, a third induction coil circuit 126 has spaced first and second end segments 126*a*, 126*b* joined by an intermediate segment 126*c*. The third induction coil circuit 126 has a third induction coil length L3 that is substantially equal to the first and second induction coil lengths L1, L2. Furthermore, the intermediate segment 126*c* of the third induction coil circuit 126 overlaps the intermediate segments 122*c*, 124*c* of the first and second induction coil circuits 122, 124. Finally, in some examples, an insulation layer 128 is disposed between the intermediate segments, such as the intermediate segments 122*c*, 124*c* of the first and second induction coil circuits 122, 124.

Figure 9A:
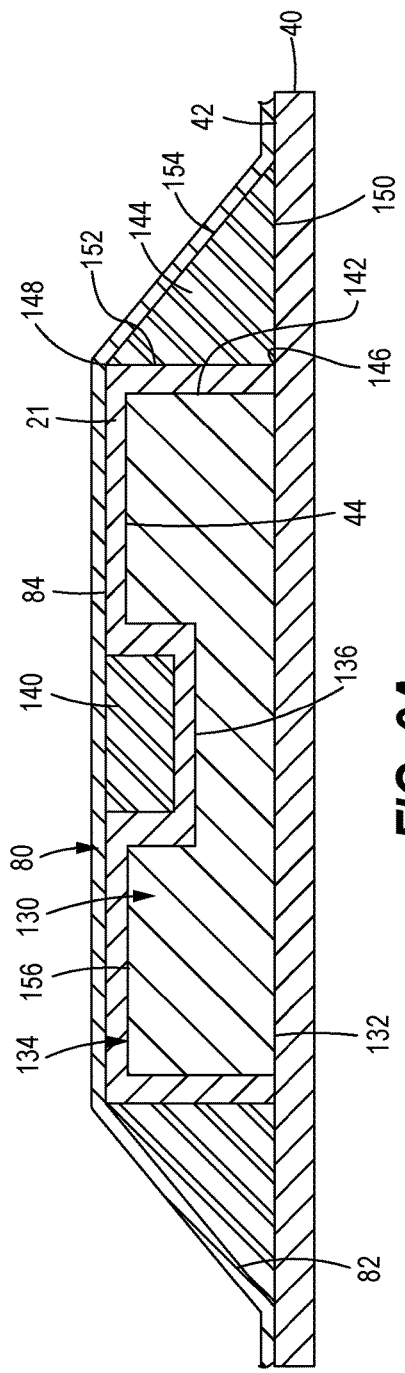
FIG. 9A is an end elevation view, in cross-section, of a tool having a non-planar tooling surface, for use in the heating apparatus of FIG. 1.
Figure 9B:
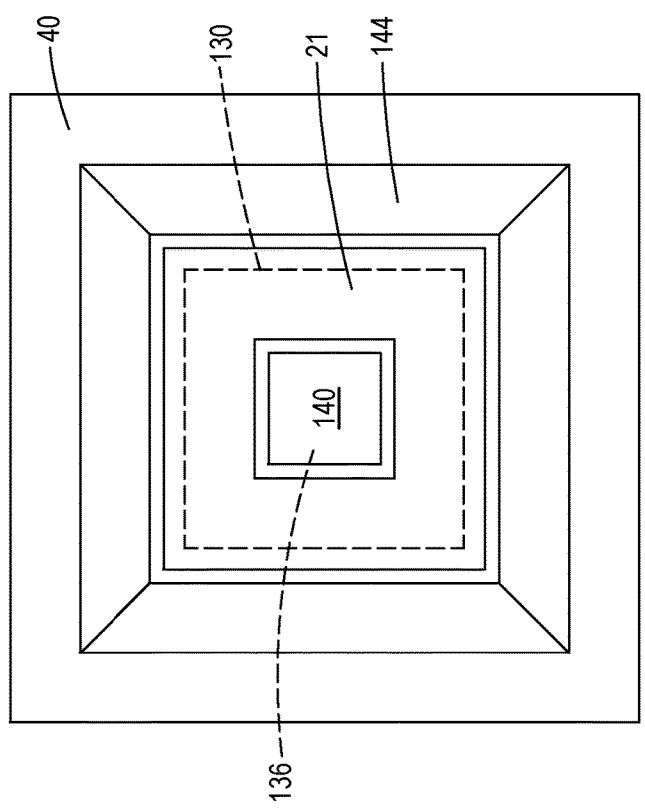
FIG. 9B is a plan view of the heating apparatus of FIG. 9A, with certain components removed for clarity.

In some applications, the heating apparatus 20 may be configured to thermally process parts having non-planar shapes. For example, FIGS. 9A and 9B illustrate a tool 130 placed on the table 40 to form the part 21 with a non-planar shape. The tool 130 is formed of a thermally conductive material, so that heat generated at the table surface 42 is further conducted through the tool 130 and ultimately to the first surface 44 of the part 21. More specifically, the tool 130 has a base surface 132 configured to engage the table surface 42 of the table 40, and a tooling surface 134 opposite the base surface 132. The tooling surface 134 is formed with a contoured shape that is non-planar. Accordingly, the tooling surface 134 of the tool 130 is configured to engage the first surface 44 of the part 21. In this example, the heating blanket 80 may also be provided, so that the heating surface 82 of the heating blanket 80 is configured to thermally couple with the second surface 84 of the part 21.

The heating apparatus 20 permits the use of additional tooling structures to more precisely form the desired shape of the part 21. For example, the contoured shape of the tooling surface 134 may include a concave section 136, and a fill part 140 formed of a thermally conductive material is configured for insertion into the concave section 136, thereby to more precisely shape a central portion of the part 21. Additionally or alternatively, the edges of the part 21 may be more precisely formed using a side wall 142 of the tool 130 and a side dam 144 spaced from and extending around a perimeter of the tool 130. When viewed in cross-section as shown in FIG. 9A, the side wall 142 of the tool 130 extends from a first end 146 adjacent the table surface 42 to a second end 148 spaced from the table surface 42. The side dam 144 has a base side 150 engaging the table surface 42, a lateral side 152 engaging the side wall 142 of the tooling surface 134, and an inclined side 154 extending between the base side 150 and the lateral side 152. While the example of the side dam 144 shown in FIG. 9A has a triangular cross-sectional shape, it will be appreciated that the side dam 144 may have other cross-sectional shapes. Still further, the contoured shape of the tooling surface 134 may include a convex section 156.

Figure 9C:
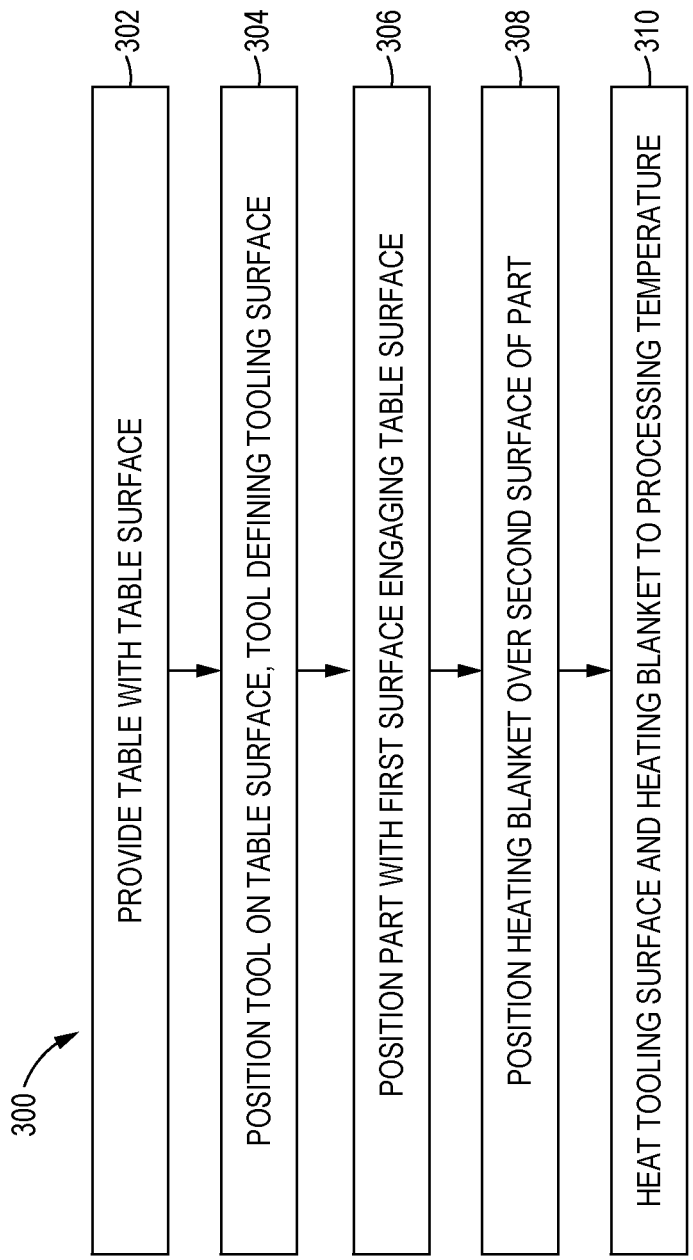
FIG. 9C is a block diagram of a method of forming a part with a non-planar contour.

FIG. 9C is a block diagram of a method 300 thermally processing a part 21 to have a non-planar shape. At block 302, the method includes providing a table 40 formed of a thermally conductive material and defining a table surface 42. Continuing a block 304, a tool 130 is placed on the table surface 42, wherein the tool 130 is formed of a thermally conductive material. The tool 130 has a base surface 132 configured to engage the table surface 42, and a tooling surface 134 opposite the base surface 132. As best shown in FIG. 9A, the tooling surface 134 has a contoured shape that is non-planar. At block 306, the method 300 includes positioning the part 21 with a first surface 44 engaging at least the tooling surface 134. At block 308, a heating blanket 80 is positioned over a second surface 84 of the part 21, the second surface 84 being opposite the first surface 84. At block 310, the method continues by heating the tooling surface 134 and the heating blanket 80 to a processing temperature for a sufficient time until the part 21 at least partially conforms to the tooling surface 134 of the tool 130.

Figure 10A:
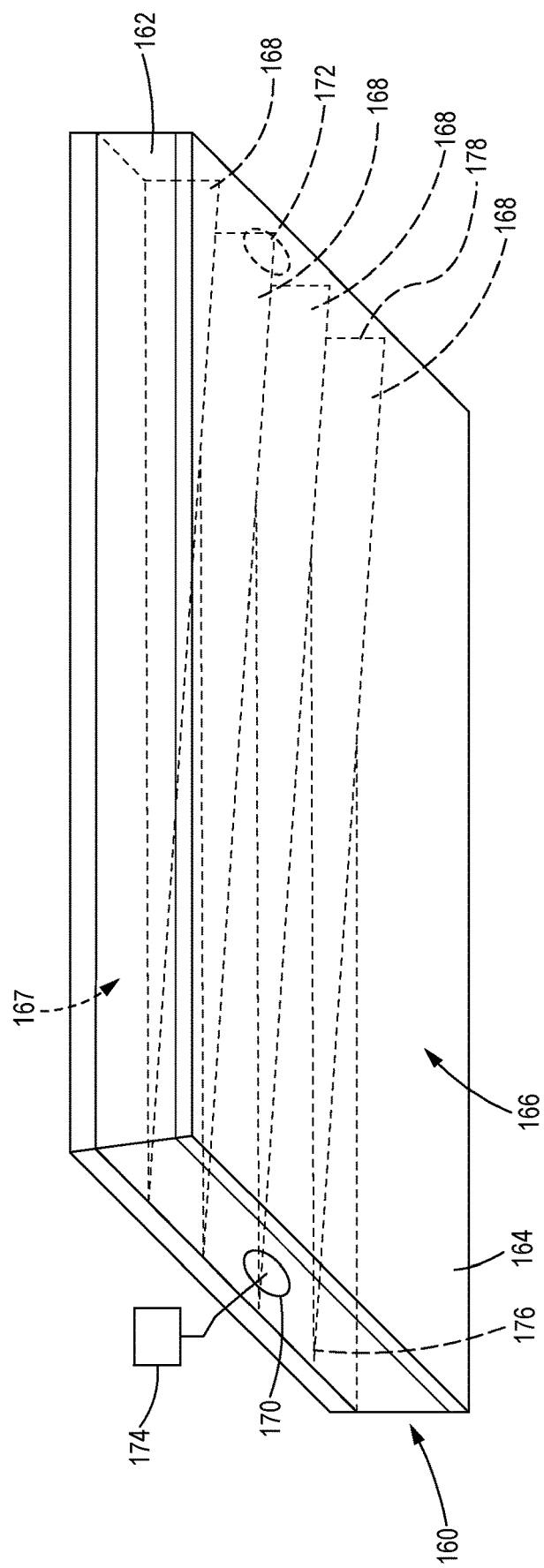
FIG. 10A is a perspective view of a thermal management system for use in the heating apparatus of FIG. 1.

In the example illustrated at FIG. 10A, the heating apparatus 20 includes a thermal management system 160 that enables more rapid heating and/or cooling of the table surface 42. More specifically, the thermal management system 160 is thermally coupled to the table 40, and includes a chamber 166 defining an interior space 167. In the illustrated example, the chamber 166 is formed by an enclosure side wall 162 coupled to the back surface 46 of the table 40, and a sheath 164 coupled to the enclosure side wall 162 and spaced from the back surface 46. Accordingly, the interior space 167 of the chamber 166 is adjacent the back surface 46 of the table 40. Furthermore, at least one cooling fin 168 is coupled to the back surface 46 of the table 40 and is disposed within the chamber 166. In the example illustrated at FIG. 10A, four cooling fins 168 are provided, however a greater or lesser number of fins may be provided. An inlet 170 and an outlet 172 extend through the chamber 166. Air residing in the chamber 166 will act as an insulator to retain heat at the table surface 42, allowing the heating apparatus 20 to more rapidly reach the processing temperature. Alternatively, cooling of the table surface 42 may be facilitated by the fins 168.

To increase the amount of cooling provided by the thermal management system 160, an air source 174 fluidly communicates with the inlet 170. The air source 174 is selectively operable to generate an air flow through the chamber 166 only when cooling is desired. Accordingly, the thermal management system 160 is selectively operable in an insulator mode, during which the air flow is prevented through the chamber 166, and a cooling mode, during which the air flow is permitted through the chamber 166. Still further, the air source may be a variable speed air source configured to produce the air flow at different air flow rates, thereby to further vary the rate of cooling when in the cooling mode.

To more uniformly distribute cooling across the table 40, each cooling fin 168 has a varying cross-sectional area. More specifically, each fin 168 has an upstream end 176, located nearer the inlet 170, and a downstream end 178, located nearer the outlet 172. The cross-sectional area of each cooling fin 168 varies from a smaller fin area at the upstream end 176 to a larger fin area at the downstream end 178. Accordingly, as the air flow travels through the chamber 166 from the inlet 170 to the outlet 172, it will increase in temperature, thereby potentially reducing cooling capacity. The larger cross-sectional area of the fins 168 at the downstream end 178 will increase cooling capacity, thereby achieving more uniform cooling across the entire length of the table 40.

Figure 10B:
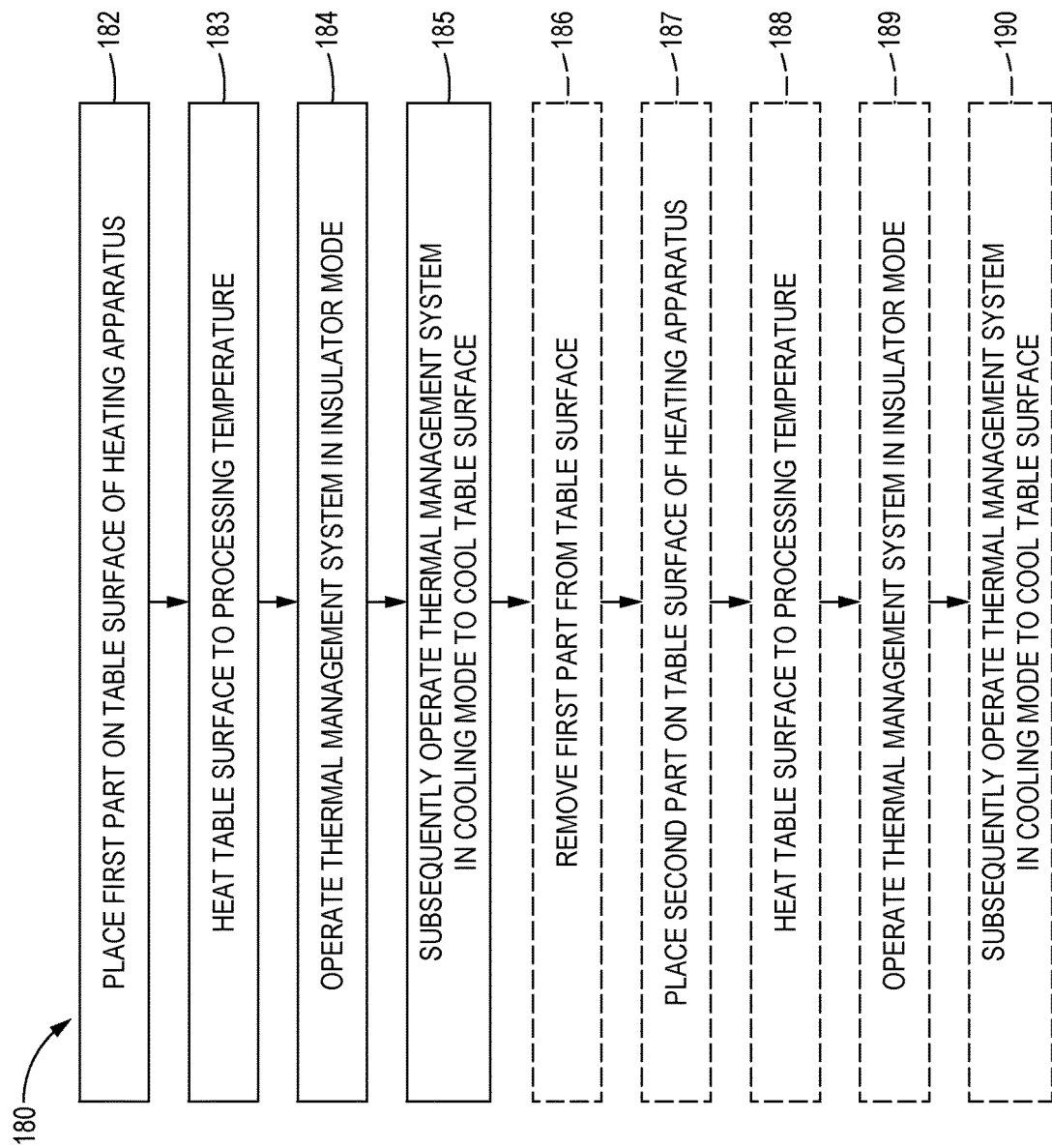
FIG. 10B is a block diagram of a method of thermally processing parts using the thermal management system of FIG. 10.
Figure 12:
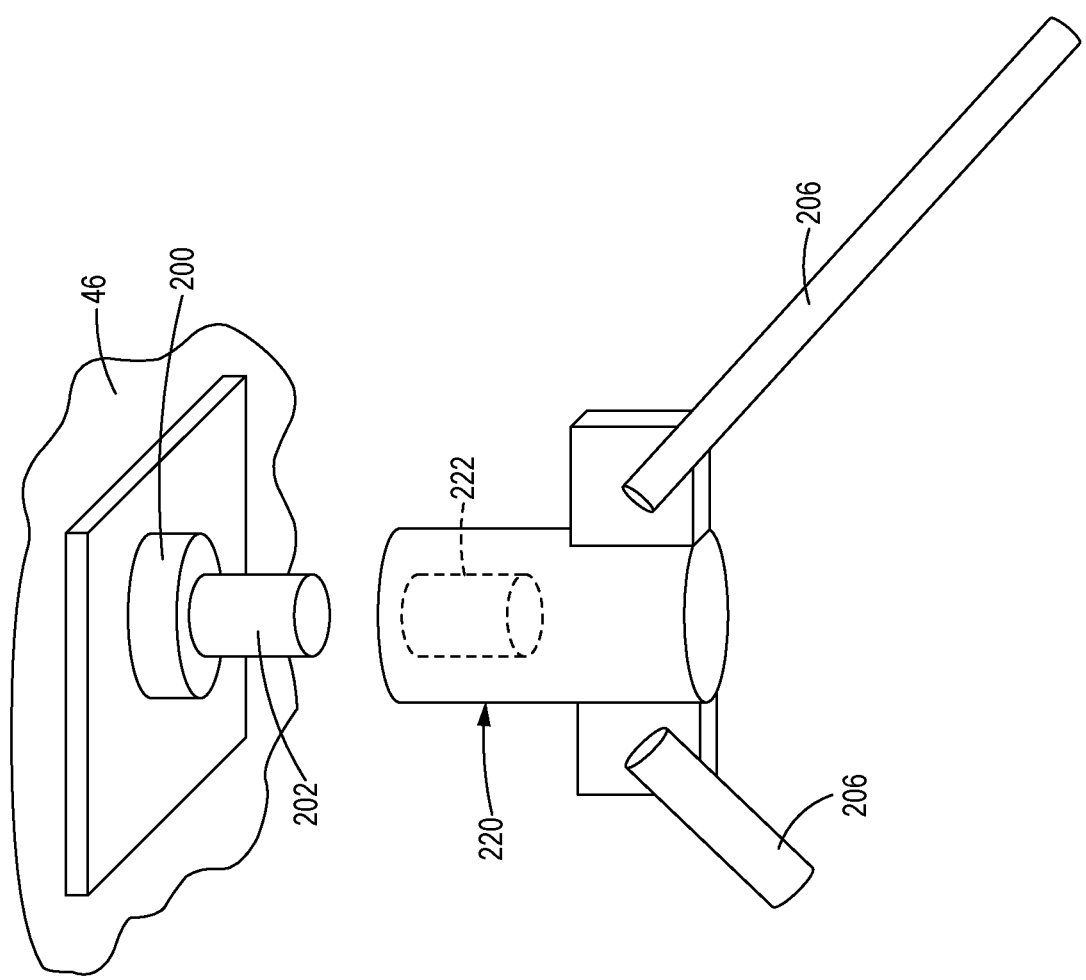
FIG. 12 is an exploded, perspective view of a hub and adapter interface for connecting a support assembly to a lower heating assembly, for use in the heating apparatus of FIG. 1.

The thermal management system 160 permits more rapid thermal processing of parts. FIG. 10B is a block diagram of a method 180 of thermally processing parts. At block 182, a first part is placed on the table surface 42 of the heating apparatus 20. At block 183, the table surface 42 is then heated to a processing temperature using the table inductive heating circuit 52. The table inductive heating circuit may include a plurality of table induction coil circuits electrically coupled in parallel with each other, wherein each of the plurality of table induction coil circuits includes a table electrical conductor and a table smart susceptor having a Curie temperature. At block 184, the thermal management system 160 provided with the heating apparatus 20 is then operated in an insulator mode to maintain the table surface 42 at the processing temperature until the first part is thermally processed. Subsequently, at block 185, the thermal management system 160 is operated in a cooling mode to cool the table surface 42 to a reduced temperature that allows safe handling of the part and/or the table. While the thermal management system 160 may be used in combination with any of the features disclosed herein, providing the thermal management system 160 in combination with locating the table inductive heating circuit 52 in the groove 54 provided on the back surface 46, as disclosed above, may advantageously increase the efficiency with which the temperature of the table 40 is raised or lowered.

In some applications, the method 180 may be used to rapidly process multiple parts. In these applications, the method 180 optionally includes removing the first part from the table surface 42 of the heating apparatus 20 at block 186, placing a second part on the table surface 42 of the heating apparatus 20 at block 187, heating the table surface 42 to the processing temperature using the table inductive heating circuit 52 at block 188, operating the thermal management system 160 in the insulator mode to maintain the table surface 42 at the processing temperature until the second part is cured at block 189, and operating the thermal management system 160 in the cooling mode to cool the table surface 42 to the reduced temperature at block 190.

The support assembly 32 of the heating apparatus 20 may be configured to minimize heat transfer from the table 40 to the surrounding environment, facilitate access by a user, and to facilitate transfer of the heating apparatus 20 to different locations. In the example illustrated at FIGS. 11A-C and 12, a plurality of hubs 200 are coupled to the back surface 46 of the table 40. To sufficiently support the table 40, at least three hubs 200 are provided, however a greater number of hubs 200 may be used. The hubs 200 are spaced from each other, and each hub 200 includes a stem 202.

The support assembly 32 is configured to support the lower and upper assemblies 34, 36 and interface with the hubs 200. Accordingly, the support assembly includes a frame 204 having a plurality of interconnected trusses 206. In some examples, the trusses 206 are provided as composite tubes, however other materials and configurations may be used. The frame 204 has an upper end 208 defining an upper end boundary 210 extending around an upper end cross-sectional area, and a lower end 212 defining a lower end boundary 214 extending around a lower end cross-sectional area. To facilitate access to the table 40, the lower end cross-sectional area is smaller than the upper end cross-sectional area, with the lower end boundary 214 being offset laterally inwardly relative to the upper end boundary 210. The support assembly further includes three adapters 220 coupled to the upper end 208 of the frame 204. Each adapter 220 is positioned for alignment with an associated hub 200 and defines a socket 222 sized to receive the stem 202 of the hub 200. By providing a truss structure having reduced mass, and minimal, spaced contact points between the support assembly 32 and the table 40, heat transfer to the surrounding environment is minimized. Thus, while the support assembly 32 may be used in conjunction with any of the other features disclosed herein, it may be advantageous to combine the support assembly 32 with the thermal management system 160 to more effectively control heating and/or cooling of the table 40. Furthermore, the stem/socket interface facilitates separation of the support assembly 32 from the lower and upper assemblies 34, 36, thereby facilitating use of a single support assembly 32 with different lower and upper assemblies 34, 36.

The support assembly 32 may further include features that secure placement and improve mobility of the heating apparatus 20. For example, as best shown in FIGS. 2 and 3, casters 230 may be coupled to the lower end boundary 214 of the frame 204. Still further, a lift sleeve 232 is disposed between the lower end boundary 214 of the frame 204 and each caster 230. Each lift sleeve 232 defines a transverse lift tool aperture 234 sized to receive a lift tool, such as a tine of a fork lift. Additionally, each caster 230 includes a brake operatively coupled to a toggle switch 236. The toggle switches 236 are interconnected by brake rods 238, which in turn are operatively coupled to a lever 240. Accordingly, operation of the lever 240 is transmitted by the brake rods 238 to the toggle switches 236, thereby to simultaneously actuate each of the toggle switches 236 between a braked position and an unbraked position.

The heating apparatus 20 further may be configured to control multiple pressure zones in the upper heating assembly 36, thereby to ensure sufficient thermal coupling of the heating blanket 80 with the part 21 while avoiding excessive damage to the heating blanket 80. In the example shown in FIG. 13, the upper heating assembly 36 includes a first flexible layer 250 sized to extend over at least a portion of the table 40 and configured to form a first pressure chamber 252 between the table 40 and the first flexible layer 250. The first pressure chamber 252 is sized to receive the part 21 and has a first pressure level P0. The upper heating assembly 36 further includes a second flexible layer 254 extending over the first flexible layer 250 to form a second pressure chamber 256 between the first flexible layer 250 and the second flexible layer 254. The heating blanket 80 is disposed in the second pressure chamber 256. Each of the first and second flexible layers 250, 254 is formed of a pliant material, such as silicone. The second flexible layer 254 has an exterior surface 258 facing away from the first flexible layer 250 and exposed to an exterior pressure level P2. The second pressure chamber 256 has a second pressure level P1 that is higher than the first pressure level P0 and lower than the exterior pressure level P2. Accordingly, the pressure differential across the first flexible layer 250 causes the first flexible layer 250 to conform closely to the part 21. The pressure differential across the second flexible layer 254 controls the amount of force applied to the heating blanket 80. Because the second pressure level P1 is higher than the first pressure level P0, the force applied by the second flexible layer 254 is less than if the second flexible layer 254 was omitted, so that the heating blanket 80 does not conform as closely to the part 21 as the first flexible layer 250. Reducing the degree to which the heating blanket 80 stretches minimizes wear and tear on the heating blanket 80. Thus, while the first and second flexible layers 250, 254 may be used in conjunction with any of the other features disclosed herein, it may be advantageous to combine them with the additional tooling structures disclosed above with reference to FIG. 9A, thereby to more precisely form the part 21 with a non-planar shape.

Figure 13:
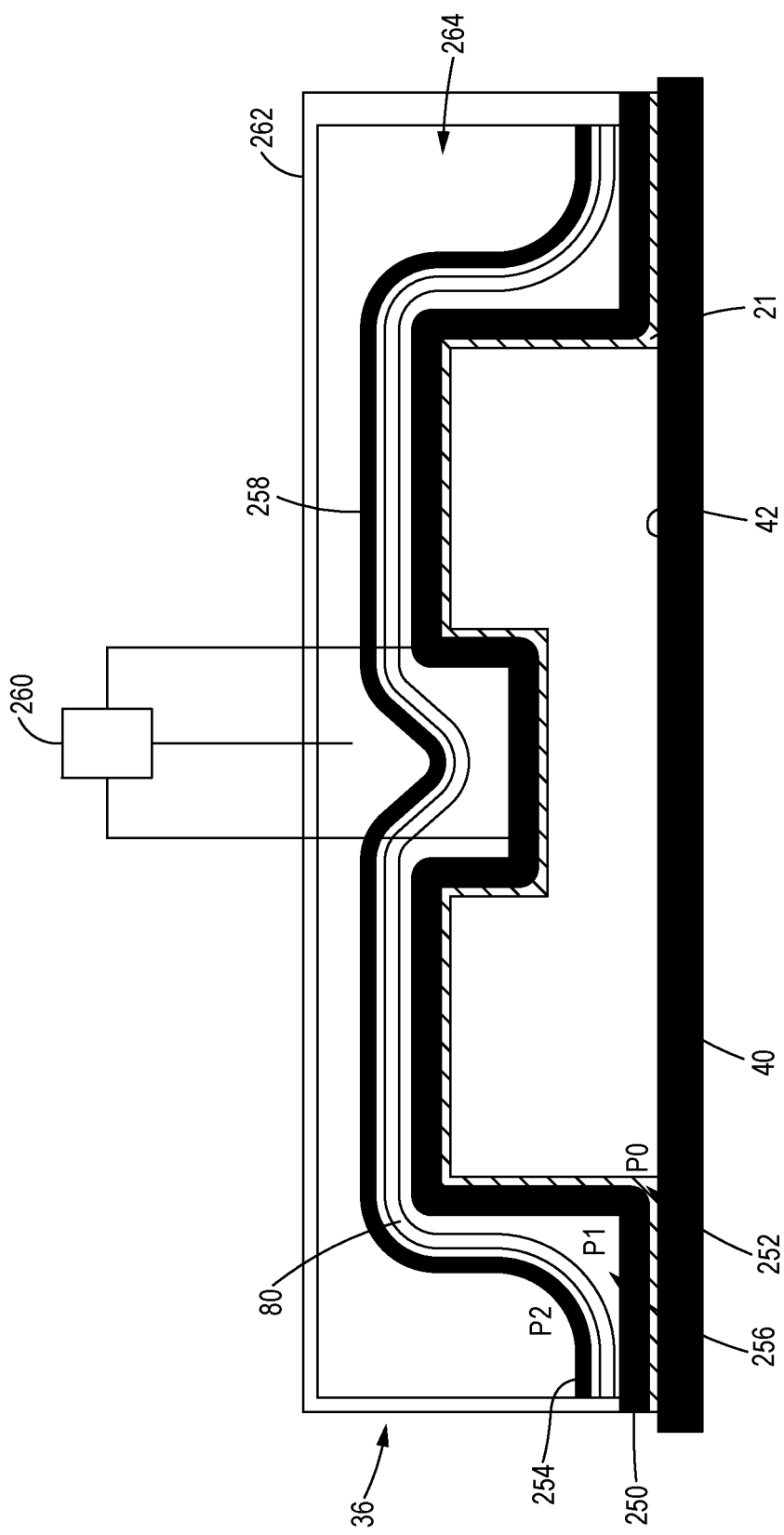
FIG. 13 is an end elevation view of a heating blanket assembly of an upper heating assembly, for use in the heating apparatus of FIG. 1.

A pressurized fluid source 260 may be provided to actively manage the pressure levels in the first and second pressure chambers 252, 256. As schematically shown in FIG. 13, the pressurized fluid source 260 fluidly communicates with the first pressure chamber 252 and the second pressure chamber 256, and is configured to generate the first pressure level P0 in the first pressure chamber 252 and the second pressure level P1 in the second pressure chamber 256.

The pressurized fluid source 260 further may be configured to manage the exterior pressure level P2. As shown in FIG. 13, the upper heating assembly 36 may include a shell 262 extending over the second flexible layer 254, thereby to define an exterior chamber 264 between the shell 262 and the second flexible layer 254. The pressurized fluid source 260 further may fluidly communicate with the exterior chamber 264, thereby to generate the exterior pressure level P2. In some examples, the first pressure level is a vacuum pressure level, and the second pressure level is equal to or higher than an atmospheric pressure level.

FIG. 14 is a block diagram of a method 400 of positioning the heating blanket by controlling the pressures in the chambers 252, 256, 264, thereby to thermally process the part 21 using the heating apparatus 20. The method 400 begins at block 402 by forming a first pressure chamber 252 between a table 40 of the heating apparatus 20 supporting the part 21 and a first flexible layer 250. At block 404, a second pressure chamber 256 is formed between the first flexible layer 250 and a second flexible layer 254, with the second flexible layer 254 having an exterior surface 258 facing away from the first flexible layer 250 and exposed to an exterior pressure level P2. A heating blanket 80 is disposed in the second pressure chamber 256, with the heating blanket 80 being formed of a pliant material and including a blanket inductive heating circuit configured to generate a processing temperature, the blanket inductive heating circuit comprising a plurality of blanket induction coil circuits electrically coupled in parallel with each other, wherein each of the plurality of blanket induction coil circuits includes a blanket electrical conductor and a smart susceptor having a Curie temperature. At block 406, the method 400 includes maintaining a first pressure level P0 in the first pressure chamber 252 that is lower than the exterior pressure level, and maintaining a second pressure level P1 in the second pressure chamber 256 that is higher than the first pressure level P0 and lower than the exterior pressure level P2.

All references, including publications, patent applications, and patents, cited herein are hereby incorporated by reference. All methods described herein can be performed in any suitable order unless otherwise indicated herein or otherwise clearly contradicted by context. The use of any and all examples, or exemplary language (e.g., "such as") provided herein, is intended to illuminate the disclosed subject matter and does not pose a limitation on the scope of the claims. Any statement herein as to the nature or benefits of the exemplary embodiments is not intended to be limiting, and the appended claims should not be deemed to be limited by such statements. More generally, no language in the specification should be construed as indicating any non-claimed element as being essential to the practice of the claimed subject matter. The scope of the claims includes all modifications and equivalents of the subject matter recited therein as permitted by applicable law. Moreover, any combination of the above-described elements in all possible variations thereof is encompassed by the claims unless otherwise indicated herein or otherwise clearly contradicted by context. Additionally, aspects of the different embodiments can be combined with or substituted for one another. Finally, the description herein of any reference or patent, even if identified as "prior," is not intended to constitute a concession that such reference or patent is available as prior art against the present disclosure.

What is claimed is:

1. A heating apparatus for thermally processing a part, comprising:
    a table formed of a thermally conductive material, and defining a table surface oriented to face a first surface of the part and a back surface opposite the table surface;
    a table inductive heating circuit configured to generate a processing temperature at the table surface, the table inductive heating circuit comprising a plurality of table induction coil circuits; and
    a thermal management system, comprising:
        a chamber coupled to the back surface of the table and defining an interior space, an inlet, and an outlet;
        at least one cooling fin coupled to the table and disposed within the interior space defined by the chamber;
        an air source in fluid communication with the inlet and configured to generate an air flow; and
        wherein the thermal management system is selectively operable between an insulator mode during which the air flow is prevented through the chamber from the inlet to the outlet to maintain the table surface at the processing temperature until the part is thermally processed, and a cooling mode during which the air flow is permitted through the chamber to cool the table surface from the processing temperature to a reduced temperature.

2. The heating apparatus of claim 1, in which the air source comprises a variable speed air source configured to produce the air flow at different air flow rates.

3. The heating apparatus of claim 1, in which the at least one cooling fin has an upstream end nearer the inlet and a downstream end nearer the outlet, a cross-sectional area of the at least one cooling fin varies from a smaller fin area at the upstream end to a larger fin area at the downstream end, and the cross-sectional area continuously varies along the table to provide a uniform temperature at the back surface of the table.

4. The heating apparatus of claim 3, in which the at least one cooling fin includes four cooling fins laterally spaced across the back surface of the table.

5. The heating apparatus of claim 1, further comprising:
    three hubs coupled to the back surface of the table and spaced from each other, each of the three hubs including a stem; and
    a support assembly coupled to the hubs, the support assembly comprising:
        a frame comprising a plurality of interconnected trusses, the frame having an upper end defining an upper end boundary extending around an upper end cross-sectional area, and a lower end defining a lower end boundary extending around a lower end cross-sectional area, wherein the lower end cross-sectional area is smaller than the upper end cross-sectional area; and
        three adapters coupled to the upper end of the frame, each of the three adapters being positioned for alignment with an associated hub and defining a socket sized to receive the stem of the associated hub.

6. The heating apparatus of claim 5, in which each truss of the plurality of interconnected trusses comprises a composite tube.

7. The heating apparatus of claim 1, in which the back surface of the table defines a plurality of grooves extending partially through the table toward the table surface, and the table inductive heating circuit is disposed within the plurality of grooves.

8. The heating apparatus of claim 7, further comprising a cover coupled to the back surface of the table and extending over the plurality of grooves.

9. The heating apparatus of claim 1, wherein the plurality of table induction coil circuits are in contact with the back surface of the table and electrically coupled in parallel with each other.

10. The heating apparatus of claim 9, wherein each of the plurality of table induction coil circuits includes a table electrical conductor and a table smart susceptor having a Curie temperature.

11. The heating apparatus of claim 10, in which:
    each table electrical conductor comprises a plurality of electrical conductor strands in a Litz wire configuration; and
    each table smart susceptor is wrapped around a respective table electrical conductor in a spiral configuration.

12. A method of thermally processing at least one part using a heating apparatus, the method comprising:
    placing a first part on a table surface of a table of the heating apparatus, wherein the table includes a back surface opposite the table surface;
    heating the table surface to a processing temperature using a table inductive heating circuit, the table inductive heating circuit comprising a plurality of table induction coil circuits;
    operating a thermal management system in an insulator mode to maintain the table surface at the processing temperature until the first part is thermally processed, the thermal management system having:
        a chamber coupled to the back surface of the table and defining an interior space, an inlet, and an outlet;

at least one cooling fin coupled to the table and disposed within the interior space defined by the chamber;
an air source in fluid communication with the inlet and configured to generate an air flow; and
wherein the thermal management system is selectively operable between the insulator mode during which the air flow is prevented through the chamber from the inlet to the outlet, and in a cooling mode during which the air flow is permitted through the chamber; and
operating the thermal management system in the cooling mode to cool the table surface from the processing temperature to a reduced temperature.

13. The method of claim 12, in which the at least one cooling fin has an upstream end and a downstream end a cross-sectional area of the at least one cooling fin varies from a smaller fin area at the upstream end to a larger fin area at the downstream end, and the cross-sectional area continuously varies along the table to provide a uniform temperature at the back surface of the table.

14. The method of claim 12, further comprising:
removing the first part from the table surface of the heating apparatus;
placing a second part on the table surface of the heating apparatus;
heating the table surface to the processing temperature using the table inductive heating circuit;
operating the thermal management system in the insulator mode to maintain the table surface at the processing temperature until the second part is cured; and
operating the thermal management system in the cooling mode to cool the table surface to the reduced temperature.

15. The method of claim 12, wherein the plurality of table induction coil circuits are in contact with the back surface of the table and electrically coupled in parallel with each other.

16. The method of claim 15, wherein each of the plurality of table induction coil circuits includes a table electrical conductor and a table smart susceptor having a Curie temperature.

17. A heating apparatus for thermally processing a part, comprising:
a table formed of a thermally conductive material, and defining a table surface oriented to face a first surface of the part and a back surface opposite the table surface, the back surface of the table defining a plurality of grooves extending partially through the table toward the table surface;
a table inductive heating circuit configured to generate a processing temperature at the table surface, the table inductive heating circuit comprising a plurality of table induction coil circuits, wherein each of the plurality of table induction coil circuits is disposed in a selected one of the plurality of grooves formed in the back surface of the table;
a thermal management system, comprising:
a chamber coupled to the back surface of the table and defining an interior space, an inlet, and an outlet;
at least one cooling fin coupled to the table and disposed within the interior space defined by the chamber;
an air source in fluid communication with the inlet and configured to generate an air flow; and
wherein the thermal management system is selectively operable between an insulator mode during which the air flow is prevented through the chamber from the inlet to the outlet to maintain the table surface at the processing temperature until the part is thermally processed, and in a cooling mode during which the air flow is permitted through the chamber to cool the table surface from the processing temperature to a reduced temperature;
three hubs coupled to the back surface of the table and spaced from each other, each of the three hubs including a stem; and
a support assembly coupled to the hubs, the support assembly comprising:
a frame comprising a plurality of interconnected trusses, the frame having an upper end defining an upper end boundary extending around an upper end cross-sectional area, and a lower end defining a lower end boundary extending around a lower end cross-sectional area, wherein the lower end cross-sectional area is smaller than the upper end cross-sectional area; and
three adapters coupled to the upper end of the frame, each of the three adapters being positioned for alignment with an associated hub and defining a socket sized to receive the stem of the associated hub.

18. The heating apparatus of claim 17, in which the at least one cooling fin has an upstream end nearer the inlet and a downstream end nearer the outlet, a cross-sectional area of the at least one cooling fin varies from a smaller fin area at the upstream end to a larger fin area at the downstream end, and the cross-sectional area varies along the table to provide a uniform temperature at the back surface of the table.

19. The heating apparatus of claim 17, wherein the plurality of table induction coil circuits are in contact with the back surface of the table and electrically coupled in parallel with each other.

20. The heating apparatus of claim 19, wherein each of the plurality of table induction coil circuits includes a table electrical conductor and a table smart susceptor having a Curie temperature.

* * * * *